United States Patent [19]

Sakurai et al.

[11] 4,219,453
[45] Aug. 26, 1980

[54] INORGANIC FILLER-INCORPORATED ETHYLENE POLYMER FILM

[75] Inventors: Hisaya Sakurai; Kisoo Moriguchi; Yoshihiko Katayama, all of Kurashiki, Japan

[73] Assignee: Asahi Kasei Kogyo Kabushiki Kaisha, Osaka, Japan

[21] Appl. No.: 942,713

[22] Filed: Sep. 15, 1978

[30] Foreign Application Priority Data

Sep. 22, 1977 [JP] Japan .................. 52-113244

[51] Int. Cl.$^2$ .................. C08K 3/24; C08K 3/26; C08K 3/30
[52] U.S. Cl. .................. 260/23 H; 260/42.13; 260/42.46
[58] Field of Search .................. 260/23 H, 42.13, 42.46

[56] References Cited

U.S. PATENT DOCUMENTS

| | | | |
|---|---|---|---|
| 3,657,114 | 4/1972 | Smith | 260/23 H |
| 3,936,403 | 2/1976 | Sakaguchi et al. | 260/23 H |
| 3,936,512 | 2/1976 | Tabara et al. | 260/23 H |
| 3,974,114 | 8/1976 | Sowa | 260/23 H |
| 3,993,718 | 11/1976 | Bontinck et al. | 260/23 H |
| 4,120,844 | 10/1978 | Meyer et al. | 260/23 H |

FOREIGN PATENT DOCUMENTS

| | | | |
|---|---|---|---|
| 667204 | 7/1963 | Canada | 260/23 H |
| 731236 | 3/1966 | Canada | 260/23 H |
| 46-41463 | 12/1971 | Japan . | |
| 49-6032 | 1/1974 | Japan . | |
| 49-11857 | 3/1974 | Japan | 260/23 H |
| 52-44877 | 4/1977 | Japan . | |
| 52-44878 | 4/1977 | Japan . | |
| 849181 | 9/1960 | United Kingdom | 260/23 H |

OTHER PUBLICATIONS

Chemical Abstracts, vol. 77, No. 16, Oct. 16, 1972 p. 102890x.
Chemical Abstracts, vol. 81, No. 4, Jul. 29, 1974 p. 14444g.

Primary Examiner—Ronald W. Griffin
Attorney, Agent, or Firm—Sprung, Felfe, Horn, Lynch & Kramer

[57] ABSTRACT

An ethylene polymer film exhibiting improved impact strength and tear strength is provided. This film is made of an inorganic filler-incorporated ethylene polymer composition which is comprised of:

(a) 35–90 wt.%, based on the ethylene polymer composition, of an ethylene polymer having a melt index of 0.005–0.2 and a specific gravity of 0.94–0.98 as measured at a temperature of 23° C., (b) 10–65 wt.%, based on the ethylene polymer composition, of a finely divided inorganic filler particle having an average particle size of 0.01–10 microns, (c) 0.1–10 wt.parts, based on 100 wt.parts of the ingredient (b), of a higher fatty acid, (d) 0.5–15 wt.parts, based on 100 wt.parts of the ingredient (b), of a metal salt of a higher fatty acid, and (e) 0.05–5 wt.parts, based on 100 wt.parts of the ingredient (b), of a stabilizer composition predominantly comprised of a phenolic stabilizer.

The ethylene polymer film is produced by extruding the ethylene polymer composition at 150°–250° C. through a ring die having lips with a gap of 0.7–3.0 mm, at a blow ratio of 2/1–8/1 and a frost line height of 200–2,000 mm.

5 Claims, 2 Drawing Figures

Fig. 1

Fig. 2

INORGANIC FILLER-INCORPORATED ETHYLENE POLYMER FILM

This invention relates to an ethylene polymer film, which is made of a ethylene polymer composition having uniformly dispersed therin a high concentration of a finely divided inorganic filler particle, and which film is characterized as having improved toughness, particularly in terms of enhanced impact strength and tear strength.

It has been recently proposed to incorporate a finely divided inorganic filler into polyolefin to be formed into a film, in order to impart to the resulting film a receptibility to writing and printing inks and a paper-like hand and feel. For example, Japanese Patent Publication (KOKOKU) No. 41,463/1971 and Japanese Patent Publication (KOKAI) No. 6,032/1974 teach the incorporation of a finely divided inorganic filler such as silica, alumina, calcium carbonate, magnesium oxide or calcium silicate, together with a metal salt of a higher fatty acid, into a polyolefin base to be formed into a film, such as a high density polyethylene or a polyblend of a high density polyethylene with polypropylene or a low density polyethylene.

It has been found by the inventors that most conventional techniques, including those of the above-mentioned Japanese Patent Publications, of incorporating a finely divided inorganic filler into a polyethylene base to be formed into a film are liable to produce films poor in mechanical strengths such as impact strength and tear strength. In general, the larger the relative amount of a finely divided inorganic filler to be added to a polyethylene base, the poorer the mechanical strengths of the films. Accordingly, the relative amount of a finely divided inorganic filler added to a polyethylene base must be within a certain limit. Furthermore, the incorporation of a large amount of a finely divided inorganic filler into a polyethylene base has been found to produce, when a film is formed by using an inflation procedure, a film having undesirable creases and a nonuniform thickness.

Conventional inorganic filler-incorporated polyethylene films may have some commercial utility to a limited extent, for example, as a sort of so-called "synthetic papers". However, such films have little or no utility in applications where mechanical strengths are required, such as packaging films or engineering applications.

A main object of the present invention is to provide an inorganic filler-incorporated ethylene polymer film which exhibits improved mechanical strengths and which has commercial utility under broad applications including packaging films and engineering applications.

Other objects and advantages of the present invention will be apparent from the following description.

In accordance with the present invention, there is provided an inorganic filler-incorporated ethylene polymer film made of an ethylene polymer composition comprised on the following ingredients (a) through (e).

(a) 35 to 90% by weight, based on the weight of the ethylene polymer composition, of an ethylene polymer having a melt index of from 0.005 to 0.2 and a specific gravity of from 0.94 to 0.98 as measured at a temperature of 23° C., (b) 10 to 65% by weight, based on the weight of the ethylene polymer composition, of a finely divided inorganic filler particle having an average particle size of from 0.01 to 10 microns, (c) 0.1 to 10 parts by weight, based on 100 parts by weight of the inorganic filler particle, of a higher fatty acid, (d) 0.5 to 15 parts by weight, based on 100 parts by weight of the inorganic filler particle, of a metal salt of a higher fatty acid, and (e) 0.05 to 5 parts by weight, based on 100 parts by weight of the inorganic filler particle, of a stabilizer composition predominantly comprised of a phenolic stabilizer.

The filler-incorporated ethylene polymer film is produced by extruding, after being kneaded at an elevated temperature, the above-mentioned ethylene polymer composition at a temperature of from 150° C. to 250° C. through a ring die having lips with a gap of from 0.7 to 3.0 mm at a blow ratio of from 2/1 to 8/1 and at a frost line height of from 200 to 2,000 mm.

The ethylene polymer used for the preparation of the film of the present invention has a melt index (hereinafter abbreviated as "MI") of from 0.005 to 0.2 and a specific gravity of from 0.94 to 0.98 as measured at a temperature of 23° C. By the term "ethylene polymer" used herein is meant not only a homopolymer of ethylene but also a copolymer comprised of a predominant amount (of usually at least 90% by weight) of the units derived from ethylene and a minor amount (of usually not more than 10% by weight) of the units dirived from at least one other α-olefin. Furthermore, the "ethylene polymer" may be a polyblend comprised of a predominant amount of the above-defined ethylene homopolymer or copolymer and a minor amount of at least one other olefinic polymeric material, provided that the polyblend exhibits the above-mentioned melt index and specific gravity. The polymeric material to be blended with the ethylen homopolymer or copolymer can be, for example, rubber, another ethylene polymer having a specific gravity lower than that of the above-mentioned ethylene homopolymer or copolymer, polypropylene or an ethylene-vinyl acetate copolymer. The amount of the polymeric material to be blended with the ethylene homopolymer or copolymer is usually not more than 30% by weight based on the weight of the polyblend.

The ethylene polymer can advantageously be a polymeric material having a MI of from 0.01 to 0.15, a melt index ratio (hereinafter abriviated as "MIR") of from 80 to 220 and a specific gravity of from 0.94 to 0.98 as measured at a temperature of 23° C.; which material being selected from an ethylene homopolymer or copolymer and a polyblend thereof.

By the term "MI" used herein is meant a melt index as determined at a temperature of 190° C. and at a load of 2.16 Kg according to ASTM D-1238 and expressed in g/10 min. By the term "MIR" used herein is meant a ratio of HMI/MI wherein MI is as defined above and HMI is a melt index as determined at a temperature of 190° C. and at a load of 21.6 Kg according to ASTM D-1238 and expressed in g/10 min.

The finely divided inorganic filler particle used for the preparation of the film of the invention usually exhibits a particle size which is within the range of from 0.01 to 10 microns on the average. The inorganic filler used can be, for example, zinc oxide, titanium oxide, magnesium oxide, aluminum hydroxide, magnesium hydroxide, calcium carbonate, basic magnesium carbonate, calcium silicate, magnesium silicate, solium aluminosilicate, potassium aluminosilicate, lithium aluminosilicate, silicic anhydride, alumina, clay, talc, wollastonite, barium sulfate or calcium sulfate. These inorganic fillers may be used either alone or in combination. Of these inorganic fillers, a finely divided powder of zinc oxide, titanium oxide, calcium carbonate, barium sulfate, clay or a mixture thereof, having an average particle size of within the range of from 0.1 to 5 microns, is preferable in view of the high drgree of toughness of the film made therefrom.

The content of the finely divided inorganic filler particle in the ethylene polymer composition to be formed into a film should be within the range of from 10 to 65% by weight, preferably from 15 to 60% by weight, based on the weight of the ethylene polymer composition. When the content of the finely divided inorganic filler particle is lower than this range, the resulting film is poor in toughness and has little or no paper-like hand and feel. In contrast, when the content of the finely divided inorganic filler particle exceeds the above-mentioned range, it is difficult to produce a desirably thin film.

As the higher fatty acid, a fatty acid having 6 to 40 carbon atoms, more preferably from 8 to 30 carbon atoms, may be used in the present invention. The higher fatty acid may be either saturated or unsaturated. The higher fatty acid can be, for example, caproic acid, caprylic acid, capric acid, lauric acid, myristic acid, palmitic acid, stearic acid, arachic acid, behenic acid, lignoceric acid, cerotic acid, montanic acid, melissinic acid, caproleinic acid, lauroleinic acid, myristoleinic acid, petroselinic acid, oleic acid, elaidic acid, erucinic acid, linoleic acid, hiragonic acid, linoleinic acid, moroctic acid, ricinoleic acid or isopalmitic acid. These higher fatty acids may be used either alone or in combination.

The amount of the higher fatty acid used, should be within the range of from 0.1 to 10 by weight, preferably from 0.5 to 7 parts by weight, based on the weight of the finely divided inorganic filler particle. When the amount of the higher fatty acid is less than the minimum amount of the above-mentioned range, the finely divided inorganic filler particle is less activated, and the resulting film is thus poor in toughness. In contrast, when the amount of the higher fatty acid exceeds the upper limit of the above-mentioned range, the resulting film exhibits physical properties approximately similar to those of a film obtained from the ethylene polymer composition containing 10 parts by weight or less of the higher fatty acid, and is therefore not advantageous in view of the migration of the higher fatty acid.

As the metal salt of a higher fatty acid, metal salts of a fatty acid having 8 to 40 carbon atoms, preferably 10 to 30 carbon atoms, may be used. Such higher fatty acid salts can be, for example, stearate, laurate, myristate, palmitate, lignocerate, cerotate, montanate, ricinoleate, lauroleinate, behenate, oleate or linoleate. The metal ingredient of these higher fatty acid salts may be selected from, for example, Na, Li, Mg, Ca, Ba, Al, Cd, Zn, Pb, Sn, Ni and Fe. The higher fatty acid metal salts may be used either alone or in combination.

The amount of the higher fatty acid metal salts used should be within the range of from 0.5 to 15 parts by weight, preferably from 1 to 10 parts by weight, based on the weight of the finely divided inorganic filler particle. When the amount of the higher fatty acid salt is outside this range, the resulting film is poor in shapability as well as toughness.

For obtaining optimum films having a particularly high degree of toughness, it is required that the amount of the higher fatty acid and the amount of the higher fatty acid metal salt be maintained within the abovementioned ranges, respectively, and further, that the ratio by weight of the amount of the higher fatty acid and the amount of the higher fatty acid metal salt be maintained within the range of from 1:0.5 to 1:2.

The phenolic stabilizer used for the preparation of the film of the invention can be, for example, hydroquinone, pyrogallol, hydroquinone monomethyl ether, 4-tert.butylcatechol, 2-methyl-6-tert.butylphenol, 2,4-dimethyl-6-tert.butylphenol, 3-methyl-4-isopropylphenol, 2,6-di-tert.butylphenol, 2,6-di-tert.butyl-4-methylphenol, 2,5-di-tert.butylhydroquinone, 4-hydroxymethyl-2,6-di-tert.butylphenol, 2,6-di-tert.butyl-4-methoxymethylene-phenol, 4,4'-dioxydiphenyl, P,P'-isopropylidenediphenol, 1,1-bis(4-hydroxyphenol)cyclohexane, 4,4'-bis(2,6-di-tert.butylphenol), 4,4'-butylidenebis(3-methyl-6-tert.butyl-phenol), 4,4'-thiobis(6-tert.butyl-3-methylphenol), 2,2'-methylenebis(4-methyl-6-tert.butylphenol), 2,2'-methylene-bis(4-ethyl-6-tert.butylphenol), 2,2'-thiobis(4-methyl-6-tert.butylphenol), 2,4-dimethyl-6-α-methylcyclohexylphenol, 1,1,3-tris(2-methyl-4-hydroxy-5-tert.butylbenzylbutane), 1,3,5-trimethyl-2,4,6-tris(3,5-di-tert.butyl-4-hydroxybenzyl)benzene, 1,3,5-trimethyl-2,4,6-tris(3,5-di-tert.butyl-4-hydroxybenzoyl)benzene, pentaerythrityl-tetrakis[3-(3,5-di-tert.butyl-4-hydroxyphenyl)propionate] or octadecyl-3-(3,5-di-tert.butyl-4-hydroxyphenyl)propionate. These phenolic stabilizers may be used either alone or in combination.

The phenolic stabilizer may also be used in combination with at least one other stabilizer such as a sulfur-containing stabilizer, a phosphorus-containing stabilizer or an amine stabilizer. In this case, the phenolic stabilizer should occupy at least 50% by weight of the stabilizer composition.

The amount of the stabilizer composition predominantly comprised of a phenolic stabilizer should be within the range of from 0.05 to 5 parts by weight, preferably from 0.1 to 3 parts by weight, based on 100 parts by weight of a finely divided inorganic filler particle. When the amount of the stabilizer composition used is smaller than this range, the resulting film is poor in thermal stability and shapability as well as toughness. In contract, when the amount of the stabilizer composition exceeds the upper limit of the above range, the resulting film exhibits a degree of toughness which is similar to that of a film obtained by using an amount of stabilizer compositon falling within the above-mentioned range. Accordingly, the resulting film is not advantageous in that the stabilizer tends to migrate and cause discoloration of the film.

The ethylene polymer composition to be shaped into the film of the present invention may contain, in addition to the above-mentioned five ingredients, i.e., (a) a high density polyethylene, (b) a finely divided inorganic filler, (c) a higher fatty acid, (d) a metal salt of a higher fatty acid (e) a stabilizer, minor amounts of other additives such as plasticizers, ultraviolet absorbers, lubricants, pigments, fire or flame retardants, antistatic agents, thickening agents and blowing agents.

A uniform mixture comprised of the above-mentioned five ingredients is prepared by mixing and kneading the respective ingredients at an elevated temperature. For example, the five ingredients (a), (b), (c), (d) and (e) are blended together, and then the blend is kneaded, or four ingredients (b), (c), (d) and (e) are first blended together and then ingredient (a) is added to the blend, followed by kneading of the blend; or ingredients (b) and (c) are first blended together and then ingredients (a), (d) and (e) are added to the blend followed by kneading of the blend. Blending is preferably carried out at a temperature of from 50° to 200° C. and under an anhydrous condition, i.e., while water and other volatile matters produced by blending the respective ingredients are removed from the blend.

The kneading apparatus used may be conventional and selected from, for example, Banbury mixer, kneader and mixing roll. The kneading temperature may be within the range of from the softening or melting point of the particular ethylene polymer used to the thermally degrading point thereof; but the optimum kneading temperature is within the range of from 200° to 280° C., in view of the toughness of the resulting film.

For obtaining a film of a desired toughness, the kneaded ethylene polymer composition is subjected to an inflation film-shaping procedure as follows. That is, the ethylene polymer composition is extruded at a temperature of from 150° to 250° C. through a ring die having lips with a gap of from 0.7 to 3.0 mm, at a blow ratio of from 2/1 to 8/1 and at a frost line height of from 200 to 2,000 mm.

When the extrusion temperature is lower than 150° C., it is difficult to effect the above-mentioned extrusion under a stable operating condition. In contrast, the extrusion temperature exceeding 250° C. tends to result in a creased or slack film which is poor in toughness.

The gap size in the lips of the ring die should not exceed 3 mm because, when the gap size is too large, it becomes difficult to produce, under a stable operating condition, a film of a uniform section which is free from crease or slack.

When the blow ratio is less than 2/1, the tear strength in the longitudinal direction is low and the ratio of the tear strength in the longitudinal direction to that in the transverse direction becomes undesirably decreased, and the falling weight impact strength becomes lower than that of a film made from the ethylene polymer having no inorganic filler incorporated therein. In contrast, when the blow ratio is greater than 8/1, the tear strength in the transverse direction is low and the ratio of the tear strength in the longitudinal direction to that in the transverse direction becomes undesirably increased, and the falling weight impact strength becomes lower than that of a film made from the ethylene polymer having no inorganic filler.

Similarly, when the frost line height is less 200 mm, the ratio of the tear strength in the longitudinal direction to that in the transverse direction becomes undesirably decreased, leading to a reduction in the falling weight impact strength. In contrast, when the frost line height exceeds 2,000 mm, it becomes difficult to produce a film of an acceptable quality under a stable operating condition.

One preferable combination of the inflation film-shaping conditions, which is particularly suitable for the production of a film of less than 40 microns in thickness, is as follows:
Extrusion temperature: 180°–220° C.,
Die lip gap: 0.8–1.5 mm,
Blow ratio: 2.5/1–5.5/1,
Frost line height: 300–900 mm.
Another preferable combination particularly suitable for the production of a film of 40–200 microns in thickness is as follows:
Extrusion temperature: 170°–210° C.,
Die lip gap: 1–2.5 mm,
Blow ratio: 3/1–6/1,
Frost line height: 400–1,200 mm.

Provided that the respective inflation film-shaping conditions are in the above-mentioned ranges, some modifications may be made. For example, the tubular extrudate may be cooled by using a cooling medium such as water or an aqueous surface active agent solution for imparting a special surface luster to the film.

The advantages of the film of the present invention are summarized as follows.

(1) The film of the present invention exhibits good mechanical strengths such as impact strength and tear strength. The degrees of the impact strength and tear strength are similar to or higher than those of a conventional film made from the ethylene polymer base having no inorganic filler incorporated therein.

(2) The improved mechanical strengths can be obtained for both a thin film of approximately 10 microns in thickness and a thick film of 100 microns or more in thickness.

(3) Provided that the amount of a finely divided inorganic filler falls within the above-mentioned and claimed range, the mechanical strenghs of the film of the present invention are not reduced with an increase in the amount of the incorporated inorganic filler. This feature is strikingly different from those of conventional polyolefin films made from polyolefin compositions having incorporated therein about 10% by weight or more of an inorganic filler, wherein the mechanical strengths of the films are reduced with an increase in the amount of the inorganic filler incorporated.

(4) The film of the present invention exhibits the so-called "paper-like" hand and feel and an improved receptibility to writing and printing inks. If desired, this advantage can be enhanced by increasing the amount of the inorganic filler used, without a reduction in the desired mechanical strengths.

The present invention will be further illustrated by the following examples and comparative examples. It should be understood, however, that the invention is not limited to the specific details described in the examples set forth below.

In the following examples and comparative examples, all parts are by weight, and the falling weight impact strength and the tear strength have been determined in accordance with ASTM D-1709 and JIS (Japanese Industrial Standard) P-8116, respectively.

EXAMPLE 1-1

Fifty-three parts of a finely divided polyethylene having a MI of 0.07, a MIR of 110 and a specific gravity of 0.955, 45 parts of a finely divided zinc oxide having an average particle size of 0.7 micron, 1.0 part of stearic acid, 1.0 part of calcium stearate and 0.15 part of 2,6-di-tert.butyl-p-cresol were well mixed together by using a Henschel mixer, while these ingredients were maintained at 120° C. whereby volatile matters were removed therefrom. The mixture was kneaded at 255° C. for three minutes by using a Banbury mixer, shaped into a sheet by using a roll, and then pelleted by using a pelletizer. The pellets so obtained were dried at 105° C. for two hours. The dried pellets exhibited a water content of 350 ppm as measured according to Karl Fischer's method. The dried pellets were shaped into a film by an inflation method using an extruder provided with a screw having a diameter of 40 mm, an L/D ratio of 22 and a compression ratio of 4.0, and a ring die having lips with a gap of 1.2 mm and having a diameter of 40 mm. The inflation conditions were: extrusion temperature=190° C., blow ratio=4.0, frost line height=500 mm and film thickness=28 microns.

The film so produced was free from crease, uniform in section, white and opaque, and of a paper-like hand and feel. The falling weight impact strength and tear strength of the resultant film are shown in Table I, below.

EXAMPLE 1-2

Following the procedure mentioned in Example 1-1, a film was produced wherein the amounts of stearic acid and calcium stearate were changed to 0.5 part and 1.5 parts, respectively, with all other conditions remaining substantially the same. The impact strength and tear strength of the resultant film are shown in Table I, below.

Comparative Example 1-1

Following the procedure mentioned in Example 1-1, a film was produced wherein stearic acid and 2,6-di-tert.-butyl-p-cresol were not used, and the amount of calcium stearate was changed to 2.0 parts with all other conditions remaining substantially the same.

The resultant film had a large number of creases and was not uniform in thickness. The impact strength and tear strength of the film are shown in Table I, below.

Comparative Example 1-2

Following the procedure mentioned in Example 1-1, a film was produced wherein, instead of the above-mentioned five-ingredient composition, 100 parts of a finely divided polyethylene similar to that used in Example 1-1, 0.3 part of calcium stearate and 0.1 part of 2,6-di-tert.butyl-p--cresol were used with all other conditions remaining substantially the same.

The resultant film was less uniform in thickness than the films of Examples 1-1, and 1-2, and poor in operating stability during the film-shaping procedure. The impact strength and the tear strength of the film are shown in Table I, below.

EXAMPLE 2-1

A kneaded polyethylene composition similar to that prepared in Example 1-1 was shaped into a film by using an inflation procedure under the following conditions: extrusion temperature=190° C., die lip gap=1.0 mm, blow ratio=4.0, frost line height=400 mm and film thickness=11 microns.

The film so produced was of a uniform section, pure white and translucent, and of a paper-like hand and feel. The impact strength thereof is shown in Table II, below.

EXAMPLE 2-2

A kneaded polyethylene composition similar to that prepared in Example 1-1 was shaped into a film under the following inflation conditions: extrusion temperature=185° C., die lip gap=1.2 mm, blow ratio=4.0, frost line height=500 mm and film thickness=50 microns. The impact strength of the film so produced is shown in Table II, below.

EXAMPLE 2-3

A kneaded polyethylene composition similar to that prepared in Example 1-1 was shaped into a film under the following inflation film-shaping conditions: extrusion temperature=180° C., die lip gap=2.5 mm, blow ratio=4.0, frost line height=600 mm and film thickness=120 microns. The impact strength of the film so produced is shown in Table II, below.

Comparative Example 2-1

A kneaded polyethylene composition similar to that prepared in Comparative Example 1-2, which contained no inorganic filler and which was comprised of polyethylene, calcium stearate and 2,6-di-tert.butyl-p-cresol, was shaped into a film under conditions similar to those employed in Example 2-1. The strength of the film is shown in Table II, below.

Comparative Example 2-2

Table I

| | Example No. | Example 1-1 | Example 1-2 | Comparative Example 1-1 | Comparative Example 1-2 |
|---|---|---|---|---|---|
| Polyethylene | MI (g/10 min) | 0.07 | Same as | Same as | Same as |
| | MIR | 110 | Example 1-1 | Example 1-1 | Example 1-1 |
| | Specific gravity | 0.955 | | | |
| | Amount (parts by wt.) | 53 | | | 100 |
| Inorganic | | ZnO | Same as | Same as | — |
| filler | Average particle size (micron) | 0.7 | Example 1-1 | Example 1-1 | — |
| | Amount (parts by wt.) | 45 | | | — |
| Additives | 2,6-di t-butyl-p-cresol (parts by wt.) | 0.15 | 0.15 | — | 0.1 |
| | Stearic acid (parts by wt.) | 1.0 | 0.5 | — | — |
| | Calcium stearate (parts by wt.) | 1.0 | 1.5 | 2.0 | 0.3 |
| Film-shaping | Die lip gap (mm) | 1.2 | Same as | Same as | Same as |
| condition | Extrusion temperature (°C.) | 190 | Example 1-1 | Example 1-1 | Example 1-1 |
| | Blow ratio | 4.0 | | | |
| | Frost line height (mm) | 500 | | | |
| | Film thickness (micron) | 28 | | | |
| Mechanical | Falling weight impact strength (kg-cm) | 34 | 22 | 8 | 18 |
| properties | Tear strength in longitudinal direction (kg/cm) | 50 | 38 | 10 | 18 |
| | Tear strength in transverse direction (kg/cm) | 55 | 48 | 12 | 20 |

As is seen in Table I, the films of the invention (Examples 1-1 and 1-2) exhibit impact and tear strengths far higher than those of a conventional inorganic filler-incorporated polyethylene film (Comparative Example 1-1) and also higher than those of a film made only from polyethylene (Comparative Example 1-2).

A kneaded polyethylene composition similar to that used in Comparative Example 2-1 was shaped into a film under conditions similar to those employed in Example 2-2. The impact strength of the film is shown in Table II, below.

Comparative Example 2-3

A kneaded polyethylene composition similar to that used in Comparative Example 2-1 was shaped into a film under conditions similar to those employed in Example 2-3. The impact strength of the film is shown in Table II, below.

EXAMPLE 3-2

Sixty-eight parts of a finely divided polyethylene having a MI of 0.12, a MIR of 98 and a specific gravity of 0.956, 30 parts of a finely divided heavy calcium carbonate having an average particle size of 4.5 microns, 1.0 part of a stearic acid/palmitic acid (1:1) mix- Table II

| | Example No. | Example 2-1 | Example 2-2 | Example 2-3 | Comparative Example 2-1 | Comparative Example 2-2 | Comparative Example 2-3 |
|---|---|---|---|---|---|---|---|
| Polyethylene | MI (g/10 min) | 0.07 | Same as Example 2-1 | Same as Example 2-1 | 0.07 | Same as Comparative Example 2-1 | Same as Comparative Example 2-1 |
| | MIR | 110 | | | 110 | | |
| | Specific gravity | 0.955 | | | 0.955 | | |
| | Amount (parts by wt.) | 53 | | | 100 | | |
| Inorganic filler | | ZnO | Same as Example 2-1 | Same as Example 2-1 | — | — | — |
| | Average particle size (micron) | 0.7 | | | — | — | — |
| | Amount (parts by wt.) | 45 | | | — | — | — |
| Additives | 2,6-di-t-butyl-p-cresol (parts by wt.) | 0.15 | Same as Example 2-1 | Same as Example 2-1 | 0.1 | 0.1 | 0.1 |
| | Stearic acid (parts by wt.) | 1.0 | | | — | — | — |
| | Calcium stearate (parts by wt.) | 1.0 | | | 0.3 | 0.3 | 0.3 |
| Film-shaping conditions | Die lip gap (mm) | 1.0 | 1.2 | 2.5 | 1.0 | 1.2 | 2.5 |
| | Extrusion temperature (°C.) | 190 | 185 | 180 | 190 | 185 | 180 |
| | Blow ratio | 4.0 | 4.0 | 4.0 | 4.0 | 4.0 | 4.0 |
| | Frost line height (mm) | 400 | 500 | 600 | 400 | 500 | 600 |
| | Film thickness (micron) | 11 | 50 | 120 | 11 | 50 | 120 |
| Mechanical properties | Falling weight impact strength (kg-cm) | 25 | 43 | 67 | 10 | 28 | 35 |

As can be seen from the comparison of Example 2-1, 2-2 and 2-3 with Comparative Examples 2-1, 2-2 and 2-3, the films of the invention which contain large amounts of an inorganic filler exhibit improved mechanical properties not dependent upon the film thickness (i.e., irrespective of a broad thickness range of from about 10 microns to 100 microns or more) over the films which contain no inorganic filler.

EXAMPLE 3-1

Fifty-eight parts of a finely divided polyethylene having a MI of 0.03, a MIR of 192 and a specific agarivity of 0.949, 40 parts of a finely divided colloidal calcium carbonate having an average particle size of 0.15 micron, 0.8 part of a stearic acid/palmitic acid (1:1) mixture, 1.0 part of zinc stearate and 0.08 part of 2,6-di-tert.butyl-p-cresol were well mixed together at a temperature of 110° C. by using a Henschel mixer. Then, the mixture was kneaded at a temperature of 265° C. by using a twin-agitator kneader at a rotor speed of 500 rpm and then pelleted by using a single-screw extruder. The pellets so obtained were dried at a temperature of 110° C. for five hours. The dried pellets exhibited a water content of 290 ppm. Thereafter, the dried pellets were shaped into a film by an inflation method using an extruder provided with a screw having a diameter of 50 mm, an L/D ratio of 24 and a compression ratio of 3.5, and using a ring die having lips with a gap of 1.0 mm and having a diameter of 50 mm. The inflation conditions were: extrusion temperature=210° C., blow ratio=5.0, frost line height=300 mm and film thickness=10 microns.

The film so produced was free from crease, of little or no unevenness in thickness, translucent and parchment like. The impact strength and the tear strengt of the film are shown in Table III, below.

ture, 2.0 parts of calcium stearate and 0.2 part of 2,2'-methylenebis (4-methyl-6-tert.butylphenol) were mixed, kneaded and then pelleted in a manner similar to that described in Example 3-1. A film was shaped from the pellets so obtained, by using the same film-shaping apparatus as used in Example 3-1 under the following inflation conditions: extrusion temperature=190° C., blow ratio=5.5, frost line height=1.050 mm and film thickness=30 microns.

The resultant film was free from crease, of little or no unevenness in thickness, milky and opaque, and of a paper-like hand and feel. The impact strength and the tear strength of the film are shown in Table III, below.

EXAMPLE 3-3

Forty-eight parts of a finely divided polyethylene similar to that used in Example 1-1, 52 parts of a finely divided barium sulfate having an average particle size of 0.6 micron, 1.5 parts of behenic acid, 2.0 parts of aluminum distearate and 0.2 part of a 2.6-di-tert.butyl-p-cresol/-dilauryl thiodipropionate (1:1) mixture were mixed, kneaded and then pelleted in a manner similar to that described in Example 3-1. A film was shaped from the pellets so obtained, by using the same film-shaping apparatus as used in Example 3-1 under the following conditions: extrusion temperatuer=190° C., blow ratio=4.0, frost line height=500 mm and film thickness=30 microns.

The resultant film was free from crease, of little or no unevenness in thickness, milky and translucent, and of a paper-like hand and feel. The impact strength and the tear strength of the film are sown in Table III, below

Comparative Example 3-1

Fifty-nine parts of a finely divided polyethylene similar to that used in Example 3-1, 40 parts of a finely divided calcium carbonate similar to that used in Example 3-1 and 1.0 part of zinc stearate were mixed, kneaded and then pelleted in a manner similar to that described in Example 3-1. A film was shaped from the pellets so obtained, in a manner similar to that described in Example 3-1.

The resultant film had creases and was less uniform in thickness than the film of Example 3-1. The impact strength and the tear strength of the former film were far lower than those of the latter film, as shown in Table III, below.

Comparative Example 3-2

Following a procedure similar to that employed in Example 3-2, a film was produced from a polyethylene composition, which was similar to that used in Example 3-2 but which contained no stearic acid/palmitic acid (1:1) mixture. The impact strength and the tear strength of the resultant film were far lower than tose of the film of Example 3-2, as shown in Table III, below.

Comparative Example 3-3 film was shaped from the pellets so obtained, in a manner similar to that in Example 3-2.

The resultant film was superior to the film of comparative Example 3-2, but inferior to the film of Example 3-2, as shown in Table III, below.

Comparative Example 3-5

One hundred parts of a finely divided polyethylene having a MI of 0.5, a MIR of 90 and a specific gravity of 0.953, 0.07 part of 2,6-di-tert.butyl-p-cresol and 0.2 part of calcium stearate were mixed, kneaded and then pelleted in a manner similar to that described in Example 3-1. A film was shaped from the pellets so obtained by using the same film-shaping apparatus as that used in Example 3-1 under the following conditions: extrusion temperature=200° C., blow ratio=1.8, forst line height=300 mm and film thickness=40 microns.

The resultant film was far inferior in mechanical strengths than the films of Examples 3-1, 3-2 and 3-3, as shown in Table III, below.

Table III

| | Example No. | Example 3-1 | Example 3-2 | Example 3-3 | Comparative Example 3-1 | Comparative Example 3-2 | Comparative Example 3-3 | Comparative Example 3-4 | Comparative Example 3-5 |
|---|---|---|---|---|---|---|---|---|---|
| Polyethylene | MI (g/10 min) | 0.03 | 0.12 | 0.07 | Same as Example 3-1 | Same as Example 3-2 | Same as Example 3-3 | Same as Example 3-2 | 0.5 |
| | MIR | 192 | 98 | 110 | | | | | 90 |
| | Specific gravity | 0.949 | 0.956 | 0.955 | | | | | 0.953 |
| | Amount (parts by wt.) | 58 | 68 | 46 | 59 | 68 | 46 | 98 | 100 |
| Inorganic filler | | $CaCO_3$ | $CaCO_3$ | $BaSO_4$ | Same as Example 3-1 | Same as Example 3-2 | Same as Example 3-3 | — | — |
| | Average particle size | 0.15 | 4.5 | 0.6 | | | | — | — |
| | Amount (parts by wt.) | 40 | 30 | 52 | 40 | 30 | 52 | — | — |
| Additives | Stabilizer | *1 0.08 | *3 0.2 | *5 0.2 | — | *3 0.3 | *5 0.2 | *3 0.2 | *1 0.07 |
| | Stearic acid/palmitic acid (1:1) mixture (parts by wt.) | 0.8 | 1.0 | *6 1.5 | — | — | — | — | — |
| | Fatty acid metal salt (parts by wt.) | *2 1.0 | *4 2.0 | *7 2.0 | *2 1.0 | *4 2.0 | *7 2.0 | *4 2.0 | *4 0.2 |
| Film-shaping conditions | Die lip gap (mm) | 1.0 | 1.0 | 1.0 | Same as Example 3-1 | Same as Example 3-2 | Same as Example 3-3 | Same as Example 3-2 | 1.0 |
| | Extrusion temperature (°C.) | 210 | 190 | 190 | | | | | 200 |
| | Blow ratio | 5.0 | 5.5 | 4.0 | | | | | 1.8 |
| | Frost line height (mm) | 300 | 1050 | 500 | | | | | 300 |
| | Film thickness (micron) | 10 | 30 | 30 | | | | | 40 |
| Mechanical properties | Falling weight impact strength (kg-cm) | 16 | 21 | 30 | 7 | 5 | 9 | 14 | 7 |
| | Tear strength in longitudinal direction (kg/cm) | 38 | 24 | 32 | 10 | 6 | 12 | 15 | 4 |
| | Tear strength in transverse direction (kg/cm) | 39 | 37 | 42 | 8 | 8 | 15 | 27 | 75 |

*1 2,6-di-t-butyl-p-cresol
*2 Zinc stearate
*3 2,2'-methylenebis(4-methyl-6-t-butylphenol)
*4 Calcium stearate
*5 2,6-di-t-butyl-p-cresol/dilauryl thiodipropinate (1:1) mixture
*6 Behenic acid
*7 Aluminium distearate Following a procedure similar to that employed in Example 3-3, a film was produced from a polyethylene composition, which was similar to that used in Example 3-3 but which contained no behenic acid. The impact strength and the tear strength of the resultant film were far lower than those of the film of Example 3-3, as shown in Table III, below.

Comparative Example 3-4

Ninety-eight parts of a finely divided polyethylene similar to that used in Example 3-2, 0.2 part of 2,2'-methylenebis(4-methyl-6-tert.butylphenol) and 2.0 parts of calcium stearate were mixed, kneaded and pelleted in a manner similar to that described in Example 3-1. A

EXAMPLE 4-1

Sixty parts of a finely divided polyethylene having a MI of 0.05, a MIR of 125 and a specific gravity of 0.955, 30 parts of a finely divided calcium carbonate having an average particle size of 4.5 microns, 9 parts of a finely divided titanium oxide having an average particle size of 0.4 micron, 1.0 part of stearic acid, 1.0 part of calcium stearate and 0.2 part of a 2,6-di-tert.butyl-p-cresol/-dilauryl thiodipropionate (1:1) mixture were mixed, kneaded and then pelleted in a manner similar to that described in Example 3-1. A film was shaped from the pellets so prepared, by using the same film-shaping apparatus as used in Example 3-1 under the following inflation conditions: extrusion temperature=185° C., the same. The impact strength and the tear strength of the resultant film are shown in Table IV, below.

Table IV

|  | Example No. | Example 4-1 | | Example 4-2 | Comparative Example 4-1 | Comparative Example 4-2 | Comparative Example 4-3 |
|---|---|---|---|---|---|---|---|
| Polyethylene | MI (g/10 min) | 0.05 | | Same as Example 4-1 | Same as Example 4-1 | Same as Example 4-1 | Same as Example 4-1 |
|  | MIR | 125 | | | | | |
|  | Specific gravity | 0.955 | | | | | |
|  | Amount (parts by wt.) | 60 | | | | | |
| Inorganic filler |  | CaCO$_3$ | TiO$_2$ | Same as Example 4-1 | Same as Example 4-1 | Same as Example 4-1 | Same as Example 4-1 |
|  | Average particle size (micron) | 4.5 | 0.4 | | | | |
|  | Amount (parts by wt.) | 30 | 9 | | | | |
| Additives | 2,6-di-t-butyl-p-cresol/ dilauryl thiodipropionate (1:1) mixture (parts by wt.) | 0.2 | | Same as Example 4-1 | Same as Example 4-1 | Same as Example 4-1 | — |
|  | Stearic acid (parts by wt.) | 1.0 | | | | | — |
|  | Zinc stearate (parts by wt.) | 1.0 | | | | | 1.0 |
| Film-shaping conditions | Die lip gap (mm) | 1.0 | | 1.0 | 1.0 | 1.0 | 1.0 |
|  | Extrusion temperature (°C.) | 185 | | 240 | 280 | 85 | 280 |
|  | Blow ratio | 4.0 | | 4.0 | 4.0 | 1.5 | 4.0 |
|  | Frost line height (mm) | 450 | | 450 | 450 | 50 | 450 |
|  | Film thickness (micron) | 40 | | 40 | 40 | 40 | 40 |
| Mechanical properties | Falling weight impact strength (kg-cm) | 32 | | 25 | 14 | 12 | 7 |
|  | Tear strength in longitudinal direction (kg/cm) | 35 | | 22 | 14 | 15 | 9 |
|  | Tear strength in transverse direction (kg/cm) | 40 | | 32 | 29 | 52 | 11 | blow ratio=4.0, frost line height=450 mm and film thickness=40 microns. The impact strength and the tear strength of the resultant film are shown in Table IV, below.

EXAMPLE 4-2

Following a procedure similar to that employed in Example 4-1, a film was produced from a polyethylene composition similar to that used in Example 4-1, wherein the extrusion temperature was changed to 240° C. with all other conditions remaining substantially the same. The impact strength and the tear strength of the resultant film are shown in Table 4, below.

Comparative Example 4-1

Following a procedure similar to that employed in Example 4-1, a film was produced from a polyethylene composition similar to that used in Example 4-1, wherein the extrusion tempератuer was changed to 280° C. with all other conditions remaining substantially the same. The impact strength and the tear strength of the resultant film are shown in Table IV, below.

Comparative Example 4-2

Following a procedure similar to that employed in Example 4-1, a film was produced from a polyethylene composition similar to that used in Example 4-1, wherein below ratio and the frost line height were changed to 1.5 and 150 mm, respectively, with all other conditions remaining substantially the same. The impact strength and the tear strength of the resultnat film are shown in Table IV, below.

Comparative Example 4-3

Following a procedure similar to that employed in Example 4-1, a film was produced from a polyethylene composition, which was similar to that used in Example 4-1, but which contained neither stearic acid nor 2.6-di-tert.butylp-cresol/dilauryl thiodiopropionate (1:1) mixture, with all other conditions remaining substantially As can be seen from Table IV, the mechanical strengths of the film greatly depend upon the inflation film-shaping conditions.

EXAMPLE 5-1

Seventy-eight parts of a finely divided polyethylene similar to that used in Example 1-1, 20 parts of a finely divided clay having an average particle of 1.4 microns, 0.7 part of oleic acid, 0.7 part of calcium stearate and 0.08 part of 2,6-di-tert.butyl-p-cresol were mixed, kneaded and then pelleted in a manner similar to that described in Example 3-1. A film was produced from the pellets so prepared, by using the same film-shaping apparatus as used in Example 1-1 under the following inflation conditions: extrusion temperature=190° C., blow ratio of 4.0, frost line height=1,000 mm and film thickness=60 microns.

The resultant film was free from crease and uniform in section, and of a paper-like hand and feel. The impact strength and the tear strength of the film are shown in Table V, below.

Comparative Example 5-1

Following a procedure similar to that employed in Example 5-1, a film was produced from a polyethylene composition, which was similar to that used in Example 5-1 but which contained no oleic acid. The resultant film exhibited a large unevenness in thickness. The impact strength and the tear strength of the film are shown in Table V, below.

Comparative Example 5-2

Following a procedure similar to that employed in Example 5-1, a film was produced from a polyethylene composition, which was similar to that used in Example 5-1 except that the amount of polyethylene was changed to 100 parts and no clay nor oleic acid was incorporated therein, with all other conditions remaining substantially the same. The impact strength and the tear strength of the resultant film are shown in Table V, below.

Table V

|  | Example No. | Example 5-1 | Comparative Example 5-1 | Comparative Example 5-2 |
|---|---|---|---|---|
| Polyethylene | MI (g/10min) | 0.07 | Same as Example 5-1 | Same as Example 5-1 |
|  | MIR | 110 |  |  |
|  | Specific gravity | 0.955 |  |  |
|  | Amount (parts by wt.) | 78 |  | 100 |
| Inorganic filler |  | Clay | Same as Example 5-1 | — |
|  | Average particle size (micron) | 1.4 |  | — |
|  | Amount (parts by wt.) | 20 |  | — |
| Additives | 2,6-di-t-p-cresol (parts by wt.) | 0.08 | 0.08 | 0.08 |
|  | Oleic acid (patrs by wt.) | 0.7 | — | — |
|  | Calcium stearate (parts by wt.) | 0.7 | 0.7 | 0.7 |
| Film-shaping conditions | Die lip gap (mm) | 1.5 | Same as Example 5-1 | Same as Example 5-1 |
|  | Extrusion temperature (C.) | 190 |  |  |
|  | Blow ratio | 4.0 |  |  |
|  | Frost line height (mm) | 1000 |  |  |
|  | Film thickness (micron) | 60 |  |  |
| Mechanical properties | Falling weight impact strength (kg-cm) | 41 | 15 | 30 |
|  | Tear strength in longitudinal direction (kg/cm) | 35 | 12 | 20 |
|  | Tear strength in transverse direction (kg/cm) | 46 | 20 | 28 |

EXAMPLE 6

Forty three parts of a finely divided polyethylene similar to that used in Example 1-1, 45 parts of a finely divided calcium carbonate having an average particle size of 4.5 microns, 1.0 part of stearic acid, 1.0 part of calcium stearate and 0.15 part of 2,6-di-tert.butyl-p-cresol were mixed, kneaded and then pelleted in a manner similar to that in Example 1-1. A film was shaped from the pellets so prepared, by using the same film-shaping apparatus and under the following inflation conditions: die lip gap=1.0 mm, extrusion temperature=200° C., blow ratio 3.5, frost line height=500 mm and film thickness=30 microns. The impact strength of the resulting film is shown in Table VI, below.

Comparative Example 6-1

Following a procedure similar to that employed in Example 6, a film was produced from a polyethylene composition, which was similar to that used in Example 6 except that a finely divided polyethylene having a MI of 0.3, a MIR of 85 and a specific gravity of 0.960 was used as the polyethylene ingredient, with all other condition remaining substantially the same. The impact strength of the resulting film is shown in Table VI, below.

Comparative Example 6-2

Following a procedure similar to that employed in Example 6, a film was produced from a polyethylene composition, which was similar to that used in Example 6 except that a finely divided polyethylene having a MI of 0.8, a MIR of 35 and a specific gravity of 0.953 was used as the polyethylene ingredient, with all other conditions remaining substantially the same. The impact strength of the resulting film is shown in Table VI, below.

Table VI

|  | Example No. | Example 6 | Comparative Example 6-1 | Comparative Example 6-2 |
|---|---|---|---|---|
| Polyethylene | MI (g/10 min) | 0.07 | 0.6 | 0.8 |
|  | MIR | 110 | 85 | 35 |
|  | Specific gravity | 0.955 | 0.960 | 0.953 |
|  | Amount (parts by wt.) | 43 | 43 | 43 |
| Inorganic filler |  | CaCO₃ | Same as Example 6-1 | Same as Example 6-1 |
|  | Average particle size (micron) | 4.5 |  |  |
|  | Amount (parts by wt.) | 45 |  |  |
| Additives | 2,6-di-t-butyl-p-cresol (parts by wt.) | 0.15 | Same as Example 6-1 | Same as Example 6-1 |
|  | Stearic acid (parts by wt.) | 1.0 |  |  |
|  | Calcium stearate (parts by wt.) | 1.0 |  |  |
| Film-shaping conditions | Die lip gap (mm) | 1.0 | Same as Example 6-1 | Same as Example 6-1 |
|  | Extrusion temperature (°C.) | 200 |  |  |
|  | Blow ratio | 3.5 |  |  |
|  | Frost line height (mm) | 500 |  |  |
|  | Film thickness (micron) | 30 |  |  |
| Mechanical properties | Falling weight impact strength (kg-cm) | 22 | 10 | 5 |

EXAMPLE 7

Thirty-eight parts of a finely divided polyethylene having a MI of 0.04, a MIR of 100 and a specific gravity of 0.954, 60 parts of a finely divided calcium carbonate having an average particle size of 4.5 microns, 0.12 part of 2,6-di-tert.butyl-p-cresol, 1.0 part of weight of stearic acid and 1.2 parts of calcium stearate were mixed together at 110° C. by using a Henschel mixer. The mixture was kneaded at 250° C. by using a twin agitator kneader at a rotor speed of 500 rpm and then pelleted by using a single screw extruder. The pellets so prepared were dried at 110° C. for five hours, and a film was shaped therefrom by using the same film-shaping apparatus as that used in Example 1-1 under the following inflation conditions: extrusion temperature=190° C., blow ratio=3.5, frost line height=400 mm and film thickness=40 microns.

The resultant film was white and opaque, and exhibited a slight number of slacks and creases, a reduced unevenness in its thickness, and a paper-like hand and feel. The impact strength of the film is shown in Table VII, below.

substantially the same. The resultant film exhibited non-uniformity in thickness and had a large number of creases and slacks. The impact strength of the film is shown in Table VII, below.

Table VII

| | | Example 7 | Comparative Example 7-1 | Comparative Example 7-2 | Comparative Example 7-3 | Comparative Example 7-4 | Comparative Example 7-5 | Comparative Example 7-6 | Comparative Example 7-7 | Comparative Example 7-8 |
|---|---|---|---|---|---|---|---|---|---|---|
| Polyethylene | MI (g/10 min) | 0.04 | | | Same as Example 3-1 | | | | | Same as Example 3-1 |
| | MIR | 100 | | | | | | | | 100 |
| | Specific gravity | 0.954 | | | | | | | | |
| | Amount (parts by wt.) | 38 | | | | | | | | |
| Inorganic filler | | CaCO₃ | | | Same as Example 3-1 | | | | | — |
| | Average particle size (micron) | 4.5 | | | | | | | | — |
| | Amount (parts by wt.) | 60 | | | | | | | | — |
| Additives | 2,6-di-t-butyl-p-cresol (parts by wt.) | 0.12 | — | 0.12 | — | — | 0.12 | 0.12 | — | 0.12 |
| | Stearic acid (parts by wt.) | 1.0 | — | — | 2.2 | — | 2.2 | — | 1.0 | — |
| | Calcium stearate (parts by wt.) | 1.2 | — | — | — | 2.2 | — | 2.2 | 1.2 | 0.1 |
| Film-shaping conditions | Die lip gap (mm) | 1.2 | | | Same as Example 3-1 | | | | | |
| | Extrusion temperature (°C.) | 190 | | | | | | | | |
| | Blow ratio | 3.5 | | | | | | | | |
| | Frost line height (mm) | 400 | | | | | | | | |
| | Film thickness (micron) | 40 | | | | | | | | |
| Mechanical properties | Falling weight impact strength (kg-cm) | 17 | Impossible to form film | 9 | 1 | 11 | 8 | 10 | 15 |

VII, below.

Comparative Example 7-1

The procedure described in Example 7 was repeated wherein a polyethylene composition, similar to that used in Example 7 except that 2,6-di-tert. butyl-p-cresol, stearic acid and calcium stearate were not incorporated therein, was used with all other conditions remaining substantially the same. It was impossible to obtain a film.

Comparative Example 7-2

The procedure described in Example 7 was repeated wherein a polyethylene composition, similar to that used in Example 7 except that stearic acid and calcium stearate were not incorporated therein, was used with all other conditions remaining substantially the same. It was impossible to obtain a film.

Comparative Examples 7-3 through 7-7

Following a procedure similar to that described in Example 7, films were produced from the polyethylene compositions shown in Table VII, below, with all other conditions remaining substantially the same as those employed in Example 7. The impact strengths of the resultant films are shown in Table VII, below.

Comparative Example 7-8

Following a procedure similar to that described in Example 7, a film was produced from a polyethylene composition similar to that used in Example 7 except that calcium carbonate and stearic acid were not incorporated therein and the amount of calcium stearate was changed to 0.1 part, with all other conditions remaining As can be seen from Table VII, the film of the present invention (Example 7) possesses an impact strength which is higher than that of the film made of a polyethylene composition having no inorganic filler incorporated therein (Comparative Example 7-8), and which is also much higher than those of conventional films made of polyethylene compositions having inorganic fillers incorporated therein.

EXAMPLE 8-1

Following a procedure similar to that described in Example 7, pellets were prepared from a polyethylene composition similar to that used in Example 7 except that the amounts of the polyethylene and the calcium carbonate were changed to 58 parts and 40 parts, respectively, with all other conditions remaining substantially the same. Films were shaped from the pellets so prepared, by using a film-shaping apparatus the same as that used in Example 2-1 under the following inflation conditions: extrusion temperatures=160°, 190°, 210°, 230° and 250° C., blow ratio=4.0, frost line height=400 mm and film thickness=30 microns.

Figure 1:
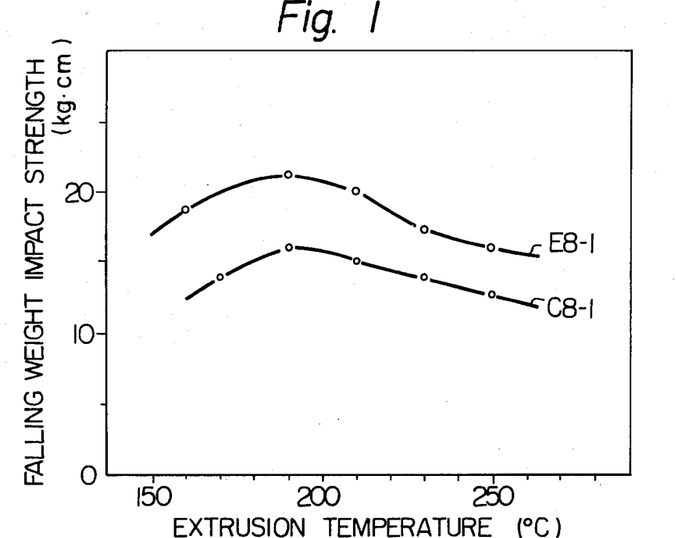

The falling weight impact strengths of the resultant films are shown as curve E8-1 in FIG. 1.

Comparative Example 8-1

Following a procedure similar to that described in Example 8-1, pellets were prepared from a polyethylene composition, which was comprised of 100 parts of a finely divided polyethylene similar to that used in Example 7, 0.12 part of 2,6-di-tert.butyl-p-cresol, 0.1 part of calcium stearate and 0.1 part of dilauryl thiodipropionate (i.e., which had no inorganic filler incorporated therein). Using the pellets so prepared, films were shaped there from in a manner similar to that described in Example 8-1 wherein extruding temperatures of 170°, 190°, 210°, 230° and 250° C. were employed separately, with all other conditions remaining substantially the same.

The falling weight impact strengths of the resultant films are shown as curve C8-1 in FIG. 1. As can be seen from FIG. 1, all of the films of the present invention (curve E8-1), which are shaped at extrusion temperatures in the range of from 150° to 250° C., are superior in impact strength when compared to the strongest (curve C8-1, extrusion temperature = 190° C.) of all the films of Comparative Example 8-1.

EXAMPLE 8-2

Films were shaped from pellets similar to those prepared in Example 8-1, by using a film-shaping apparatus the same as that used in Example 8-1 under the following inflation conditions: extrusion temperature = 190° C., blow ratio = 3.5, frost line height which was varied within the range of from 100 mm to 2,000 mm, and film thickness = 30 microns.

Figure 2:
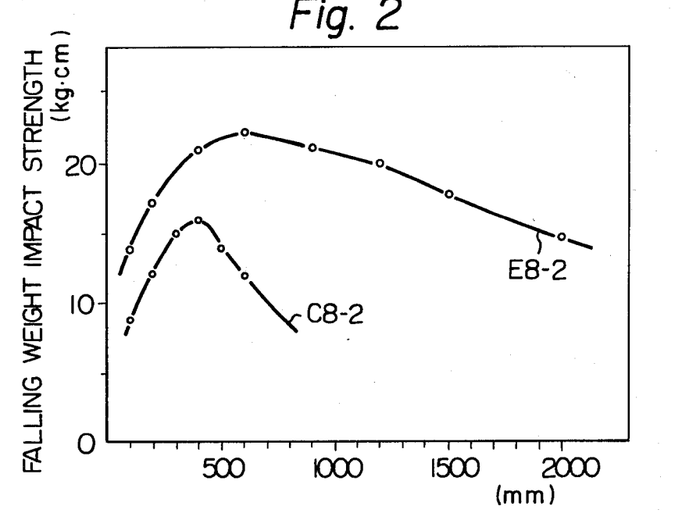

The falling weight impact strengths of the resultant films are shown as curve E8-2 in FIG. 2.

Comparative Example 8-2

Following a procedure similar to that described in Example 8-2, films were shaped from pellets similar to those prepared in Comparative Example 8-1. The falling weight impact strengths of the resultant films are shown as curve C8-2 in FIG. 2. As can be seen from FIG. 2, all of the films of the present invention (curve E8-2), which are shaped at frost line heights in the range of from 200 to 2,000 mm, are superior in impact strength when compared to the strongest (curve C8-1, frost line height = 400 mm) of all the films of Comparative Example 8-2.

What we claim is:

1. An inorganic filler-incorporated ethylene polymer film made of an ethylene polymer composition comprised of:
(a) 35 to 90% by weight, based on the weight of the ethylene polymer composition, of an ethylene polymer having a melt index of from 0.005 to 0.2, and a specific gravity of from 0.94 to 0.98 as measured at a temperature of 23° C.,
(b) 10 to 65% by weight, based on the weight of the ethylene polymer composition, of a finely divided inorganic filler particle having an average particle size of from 0.01 to 10 microns,
(c) 0.1 to 10 parts by weight, based on 100 parts by weight of the inorganic filler particle, of of a higher fatty acid,
(d) 0.5 to 15 parts by weight, based on 100 parts by weight of the inorganic filler particle, of a metal salt of a higher fatty acid, and
(e) 0.05 to 5 parts by weight, based on 100 parts by weight of the inorganic filler particle, of a stabilizer composition predominantly comprised of a phenolic stabilizer;
said inorganic filler-incorporated ethylene polymer film being produced by kneading at an elevated temperature and then extruding said ethylene polymer composition at a temperature of from 150° to 250° C. through a ring die having lips with a gap of from 0.7 to 3.0 mm, at a blow ratio of from 2/1 to 8/1 and at a frost line height of from 200 to 2,000 mm.

2. The film as claimed in claim 1 wherein the extrusion temperature is within the range of from 180° to 220° C., the gap of the ring die lips is within the range of from 0.8 to 1.5 mm, the blow ratio is within the range of from 2.5/1 to 5.5/1, the frost line height is within the range of from 300 to 900 mm, and said film has a thickness of less than 40 microns.

3. The film as claimed in claim 1 wherein the extrusion temperature is within the range of from 170° to 210° C., the gap of the ring die lips is within the range of from 1.0 to 2.5 mm, the blow ratio is within the range of from 3/1 to 6/1, the frost line height is within the range of from 400 to 1,200 mm, and said film has a thickness of from 40 to 200 microns.

4. The film as claimed in claim 1 wherein the finely divided inorganic filler particle ingredient (b) has an average particle size of from 0.1 to 5 microns and is selected from the group consisting of zinc oxide, titanium oxide, calcium carbonate, barium sulfate and clay.

5. The film as claimed in claim 1 wherein the ethylene polymer ingredient (a) has a melt index of from 0.01 to 0.15, a melt index ratio of from 80 to 220 and specific gravity of from 0.94 to 0.98; the amount of the higher fatty acid ingredient (c) is from 0.5 to 7 parts by weight, based 100 parts by weight of the inorganic filler particle ingredient (b); the amount of the higher fatty acid metal salt ingredient (d) is from 1 to 10 parts by weight, based on 100 parts by weight of the inorganic filler particle ingredient (b); the amount of the stabilizer composition ingredient (e) is from 0.1 to 3 parts by weight based on 100 parts by weight of the inorganic filler particle ingredient (b); and the ratio of the amount of the higher fatty acid ingredient (c) to the amount of the higher fatty acid metal salt ingredient (d) is in the range of from 1:0.5 to 1:2.

* * * * *